Patented Nov. 6, 1928.

UNITED STATES PATENT OFFICE.

MAX HARTMANN, OF BASEL, SWITZERLAND, ASSIGNOR TO SOCIETY OF CHEMICAL INDUSTRY IN BASLE, OF BASEL, SWITZERLAND.

MANUFACTURE OF PHYSIOLOGICALLY-ACTIVE SUBSTANCES FROM OVARIES, CORPUS LUTEUM, AND PLACENTA.

No Drawing. Application filed April 14, 1924, Serial No. 706,593, and in Switzerland May 8, 1923.

In the United States Patent No. 1,314,321, there is described a process for the manufacture of new hormones from ovaries, corpus luteum and placenta, consisting in dissolving from animal tissue, by means of a volatile solvent, the hormones, phosphatides, fats, cholesterol and esters of cholesterol, together with other material soluble in the solvent used, thereafter separately separating the phosphatides and the hormones from the mother liquor, freeing the hormones from fats, cholesterol and esters of cholesterol whereby the hormones are isolated. A particular form of the process consists in distilling in a vacuum the extract which has been freed from phosphatides so as to isolate the hormones.

It has been found that the hormones described in the said specification may be prepared in a particularly highly purified form by dissolving the animal tissue in a volatile organic fat solvent, precipitating the phosphatides, separating out the phosphatides, and then subjecting the filtrate to the action of temperatures ranging between $-50°$ to $-70°$ C.

The freezing may be conducted at any desired stage of the known processes. If the operation is carried out, e. g., according to the process described in the United States Patent No. 1,314,321, the freezing may be applied either before or after the vacuum distillation of the hormone.

The operation may consist in dissolving in a suitable solvent, such as acetone or methyl alcohol, the not distilled highly purified extract or the total distillate and cooling the solution to below $0°$ C., preferably to $-50°$ to $-70°$ C., for instance by means of a mixture of ether and solid carbon dioxide.

The extract freed by filtration from the separated matter, which consists of neutral fats, cholesterine and its esters, easily soluble phosphatides, as well as fatty acids and other substances, yields after distillation of the solvent an oily mass that may be used in this form or may be fractionally distilled in a high vacuum for the purpose of isolating the pure hormone.

The following example illustrates the invention, the parts being by weight:—

*Example.*

50 pieces of placenta are carefully dried in a vacuum at low temperature and then finely ground. The dry substance thus obtained is extracted completely with ether or another equivalent solvent in a continuously operating extraction apparatus. The solvent is evaporated and the residue is treated with 4 times its weight of acetone, whereby the phosphatides are separated and then the whole is filtered. The solution is then cooled in portions by means of a mixture of ether and solid carbon dioxide to $-50°$ to $-60°$ C. The mass solidifies to a magma, which is filtered at $-50°$ to $-60°$ C. on a filter capable of being cooled. By repeated re-solution of the precipitate and repeated cooling to $-50°$ to $-60°$ C. the last portions of active substance are separated from the inert materials. The combined solutions are evaporated and the residue, freed from acetone in a vacuum, is either distilled in a vacuum as high as possible, or is used directly.

If the acetone solution separated from phosphatides, according to the above example, is cooled down to $-10°$ C., an only insignificant separation (at most some few percent of the solid substances contained in this solution) takes place, even after a longer standing, while, when cooled down to $-50°$ to $-70°$ C., it is very easy to separate about 75% of the dissolved solid substances from the said solution.

What I claim is:

A process for the manufacture in highly concentrated form of the hormones from female internal secretory organs which comprises dissolving the animal tissue in a volatile organic fat solvent, precipitating the phosphatides, separating out the phosphatides, and then subjecting the filtrate to the action of temperatures ranging between $-50°$ to $-70°$ C.

In witness whereof I have hereunto signed my name this 2nd day of April, 1924.

MAX HARTMANN.